(12) United States Patent
Ramesh et al.

(10) Patent No.: US 7,720,164 B2
(45) Date of Patent: May 18, 2010

(54) TRANSMISSION SCHEME FOR UPLINK ACCESS IN A FDMA SYSTEM

(75) Inventors: Rajaram Ramesh, Raleigh, NC (US); Dennis Hui, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 722 days.

(21) Appl. No.: 11/678,946

(22) Filed: Feb. 26, 2007

(65) Prior Publication Data

US 2008/0205451 A1   Aug. 28, 2008

(51) Int. Cl.
*H04K 1/10* (2006.01)
*H04L 27/28* (2006.01)

(52) U.S. Cl. .................. 375/260; 370/314; 370/319; 370/321; 370/337; 370/344; 370/347

(58) Field of Classification Search .......... 370/314, 370/319, 321, 337, 344, 347; 375/260
See application file for complete search history.

(56) References Cited

U.S. PATENT DOCUMENTS

| 6,909,761 | B2 * | 6/2005 | Kloos et al. ........... 375/376 |
| 2007/0195899 | A1 | 8/2007 | Bhushan et al. | |

FOREIGN PATENT DOCUMENTS

EP    1542488 A1    6/2005

WO    WO 2007064286 A2    6/2007

OTHER PUBLICATIONS

3GPP TR 25.814 V1.2.1 (Feb. 2006) 3rd Generation Partnership Project; Technical Specification Group Radio Access Network; Physical Layer Aspects for Evolved UTRA (Release 7).
Uli Sorger , Isabella De Broeck, and Michael Schnell; 1n.terleaved FDMA—A New Spread-Spectrum Multiple- Access Scheme; Institute for Network- and Signal Theory, Darmstadt University of Technology, 0-7803-4788-9/98 1998 IEEE. pp. 1013-1017.
Yoshikazu Goto, Teruo Kawamura, Hiroyuki Atarashi, and Mamoru Sawahashi; Investigations on Packet Error Rate of Variable Spreading and Chip Repetition Factors (VSCRF)-CDMA Wireless Access in Reverse Link Multi-cell Environment; IP Radio Network Development Department, NTT DoCoMo, Inc.; 0-7803-8521-7/04; 2004 IEEE; pp. 944-948.

* cited by examiner

*Primary Examiner*—Curtis B Odom
(74) *Attorney, Agent, or Firm*—Roger S. Burleigh (57) ABSTRACT

Transmission scheme for the uplink of FDMA systems that improves performance in an interference-dominated system by using a pilot scheme that provides enough information so that channel estimates can be obtained for a particular user, but which at the same time makes it possible to use pilot patterns that are different in different cells so that co-channel interference is mitigated. A codeword is used to position a set of pilot symbols within a set of subcarriers wherein each subcarrier has a first pilot time slot and a second pilot time slot associated with one or more data time slots. The set of subcarriers are identified on which to transmit the composite signal and the first pilot time slots and the second pilot time slots are filled with the pilot symbols in accordance with the codeword. The composite signal is then formatted as a combination of modulated data and pilot signals.

47 Claims, 9 Drawing Sheets

TRANSMISSION SCHEME FOR UPLINK ACCESS IN A FDMA SYSTEM

TECHNICAL FIELD

The present invention relates in general to the field of mobile communications and, more particularly, to a transmission scheme for uplink access in a FDMA system.

BACKGROUND

The current proposal for uplink access in the $3^{rd}$ Generation Partnership Project (3GPP) Long-Term Evolution (LTE) system uses Interleaved Frequency Division Multiplexing (or Frequency Division Multiple Access (FDMA)) on the uplink as the multiple access scheme. This scheme uses subcarriers that are evenly spaced on the frequency grid or clustered together; this choice can lower the crest factor (i.e., Peak to Average Power Ratio) of the transmitted signal compared to Orthogonal Frequency Division Multiplexing (OFDM)/Orthogonal Frequency Division Multiple Access (OFDMA). With even spacing of subcarriers across the frequency grid, a signal with a significant amount of frequency diversity is obtained, which is useful for cases when no information on the radio channel is available. The clustered subcarriers are advantageous in the case when the channel is known to be good over the portion of the band where these subcarriers are used. The physical layer interface for the 3GPP LTE system is specified in the document "Physical layer aspects for evolved Universal Terrestrial Radio Access (UTRA)", 3GPP TR 25.814 V7.1.0 (2006-09) Technical Report, which is published by the 3GPP, Technical Specification Group Radio Access Network.

Figure 1:
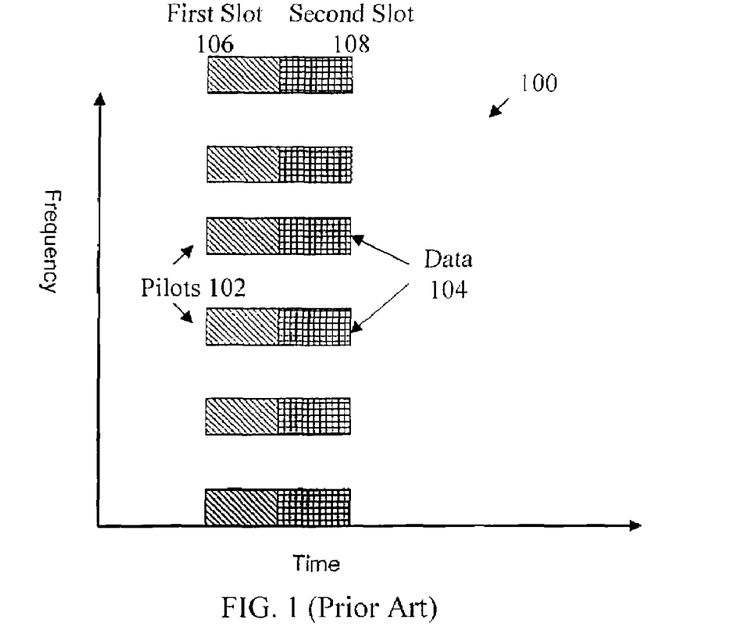
FIG. 1 shows an uplink transmission scheme that always uses pilots before the data in accordance with the prior art.

For example, FIG. 1 shows an exemplary uplink transmission scheme 100 that always uses pilots 102 before the data 104 in accordance with the signal design as described in the 3GPP contribution titled "Uplink Transmission and Multiplexing for EUTRA", presented at the 3GPP TSG RAN WG1 Ad Hoc on LTE, Sophia Antipolis, France. (2005-06-20) document number R1-050605. Part of the uplink transmission uses sixteen evenly spaced subcarriers over two timeslots—the first slot 106 contains pilot symbols 102 and the second slot 108 contains data symbols 104. At least one pilot symbol 102 is needed per subcarrier since the subcarriers are distributed and the channel can change significantly from one used subcarrier to the next.

One problem with the existing solution as described in the previous paragraph is that the pilot symbols are extremely vulnerable to interference. It is conceivable that a co-channel user in a different cell is using the same set of subcarriers to send uplink information. The pilots of the desired user then encounter a significant amount of co-channel interference and this can corrupt the channel estimates that are obtained by the receiver from the received pilot symbols. In turn, this can lead to erroneous decoding of the data even if it is protected with a strong error correction code. Thus, there is a need to improve the signal design for the uplink so that it is more resistant to co-channel interference.

Figure 2:
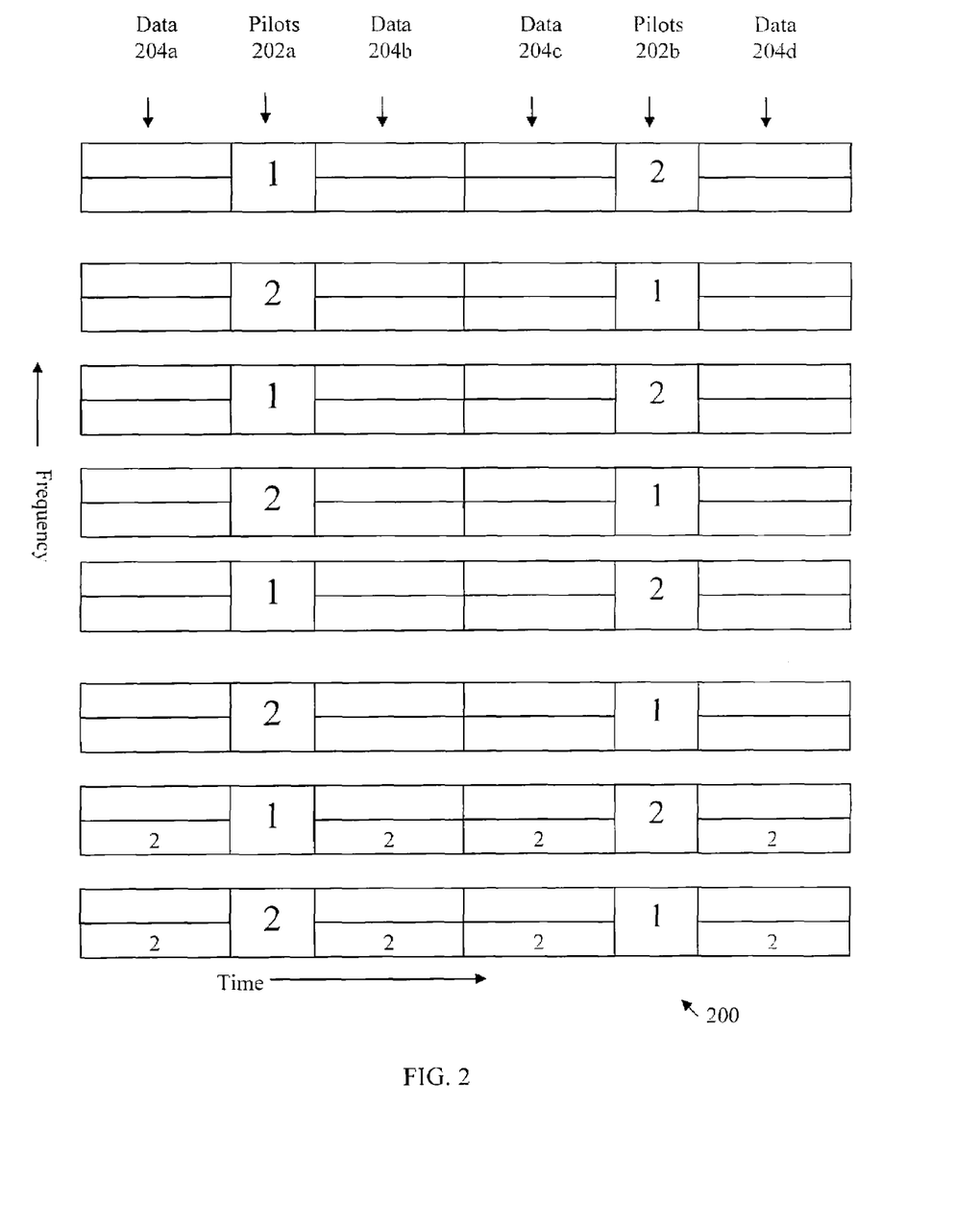
FIG. 2 shows an uplink transmission scheme that uses pilots of twice the frequency width and half the time width as data in accordance with the prior art.

In another example, FIG. 2 shows an uplink transmission scheme 200 where the pilot symbols 202a and 202b are divided into two parts over the slot, but are wider in frequency by a factor of two (and thereby narrower in time by a factor of two) compared to the data symbols 204a, 204b, 204c and 204d. Two mobile stations (users) share the pilot and data symbols. The data slots of the two mobile stations are transmitted over two adjacent sets of interleaved subcarriers (e.g., 204b and 204c). For example, user 1 may use the pilot and data symbols identified by the numeral 1, and user 2 may use the pilot and data symbols identified by numeral 2. In this case too, it is seen that either user is susceptible to co-channel interference on the pilots from other users that may be using the same set of subcarriers in a different cell. Thus, there is a need to improve the signal design in the case also.

SUMMARY

According to an aspect of the present invention, a transmission scheme is provided for uplink of a FDMA system that improves performance in an interference-dominated system by using a pilot scheme that provides enough information so that channel estimates can be obtained for a particular user, but which at the same time makes it possible to use pilot patterns that are different in different cells so that co-channel interference is mitigated. As a result, embodiments of the present invention provide better co-channel interference mitigation for pilots and better performance of the data decoding in an interference-limited situation.

For example, a first embodiment of the present invention provides a method for creating a composite signal for transmission from a mobile station to a base station. A codeword is obtained for positioning a set of pilot symbols within a set of subcarriers wherein each subcarrier has a first pilot time slot and a second pilot time slot associated with one or more data time slots. The set of subcarriers are identified on which to transmit the composite signal, which includes the first pilot time slot, the data time slot, and the second pilot time slot filled with the pilot symbols in accordance with the codeword. The composite signal is then formatted as a combination of modulated data signals and pilot signals.

Also, a second embodiment of the present invention provides a method for providing non-overlapping pilots for two mobile stations who want to communicate to the same base station. A codeword and its inverse are used to position the pilot symbols for the two mobile stations within the two pilot time slots. The two mobile stations use data symbols in a non-overlapping and interleaved fashion.

In addition, a third embodiment of this invention provides a method for changing the codeword used in a pseudorandom fashion so that the interference from a mobile station in another cell does not stay the same for all time. Mobile stations in different cells use different pseudorandom patterns of codewords to choose the particular codeword at any point in time.

A fourth embodiment of the present invention provides a mobile station that includes a receiver, a transmitter and a processor communicably coupled to the receiver and the transmitter. The processor is configured to first identify the set of subcarriers on which to transmit a composite signal such that each identified subcarrier comprises a first pilot time slot and a second pilot time slot associated with one or more data time slots. The processor is configured to then obtain a codeword for positioning a set of pilot symbols within a set of subcarriers and fills in the first pilot time slots and the second pilot time slots with the pilot symbols in accordance with the codeword. Finally, the processor is configured to format the composite signal as a combination of modulated data signals and pilot signals.

A fifth embodiment of the present invention provides a method for extracting a pilot signal from a composite signal received from a mobile station. A codeword that was sent to the mobile station is obtained wherein the codeword is used to position a set of pilot symbols within a set of subcarriers. Each subcarrier includes a first pilot time slot and a second pilot time slot associated with one or more data time slots, and the first pilot time slots and the second pilot time slots are filled with the pilot symbols in accordance with the codeword. The subcarriers dictated by the codeword are identified and the pilot signal is extracted from the composite signal. For a second mobile station, the subcarriers are dictated by the inverse of the codeword are identified, and the pilot signal for that mobile station is extracted from the composite signal.

A sixth embodiment of the invention provides a base station that includes a receiver, a transmitter and a processor communicably coupled to the receiver and the transmitter. The processor is configured to obtain a codeword that was sent to the mobile station identify a set of subcarriers dictated by the codeword and extract the pilot signal from the composite signal. The codeword is used to position a set of pilot symbols within the set of subcarriers, such that each subcarrier comprises a first pilot time slot and a second pilot time slot associated with one or more data time slots, and the first pilot time slots and the second pilot time slots are filled with the pilot symbols in accordance with the codeword. The processor is also configured to obtain a second codeword sent to a second mobile station, identify the set of subcarriers dictated by the second codeword, and extract a pilot signal from the composite signal.

A seventh embodiment of the invention provides a system that includes one or more base stations and one or more mobile stations communicably coupled to the base stations. Each base station includes a base station receiver, a base station transmitter and a base station processor communicably coupled to the base station receiver and the base station transmitter. The base station processor is configured to send a codeword to one of the mobile stations via the base station transmitter, and in response to a composite signal received from the mobile station via the base station receiver, obtain the codeword that was sent to the mobile station, identify a set of subcarriers dictated by the codeword and extract a pilot signal from the composite signal. Likewise, each mobile station includes a mobile station receiver, a mobile station transmitter and a mobile station processor communicably coupled to the mobile station receiver and the mobile station transmitter. The mobile station processor is configured to receive the codeword from the base station via the mobile station receiver, use the codeword for positioning a set of pilot symbols within the set of subcarriers such that each subcarrier comprises a first pilot time slot and a second pilot time slot associated with one or more data time slots, identify the set of subcarriers on which to transmit a composite signal, fill in the first pilot time slots and the second pilot time slots with the pilot symbols in accordance with the codeword, format the composite signal as a combination of modulated data signals and pilot signals and transmit the composite signal to the base station via the mobile station transmitter.

BRIEF DESCRIPTION OF THE SEVERAL VIEWS OF THE DRAWINGS

Further benefits and advantages of the present invention will become more apparent from the following description of various embodiments that are given by way of example with reference to the accompanying drawings, in which.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and are not intended to limit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a transmission scheme for the uplink of a FDMA system that improves performance in an interference-dominated system by using a pilot scheme that provides enough information so that channel estimates can be obtained for a particular user, but at the same time having pilot patterns that are different in different cells so that co-channel interference is mitigated. This is done by splitting the pilot pattern into two slots and using only a subset of the symbols in each slot. The choice for the pilot positions in each slot is chosen using a binary error correction code with good properties. Different cells use different codewords of the error correction code to choose their pilot patterns, and in this way it can be assured that the overlap between pilot patterns in different cells is kept low, thus leading to lower co-channel interference on the pilots and potentially improved performance. The present invention provides better co-channel interference mitigation for pilots and better performance of the data decoding in an interference-limited situation. Since only a subset of the slot is used for pilots, all subcarriers are not used, and in addition, the used subcarriers are not regularly spaced for all codewords. Thus, this transmission scheme can increase the crest factor (i.e. Peak to Average Power Ratio), however this is mitigated by the fact that using fewer subcarriers lowers the crest factor.

Figure 3:
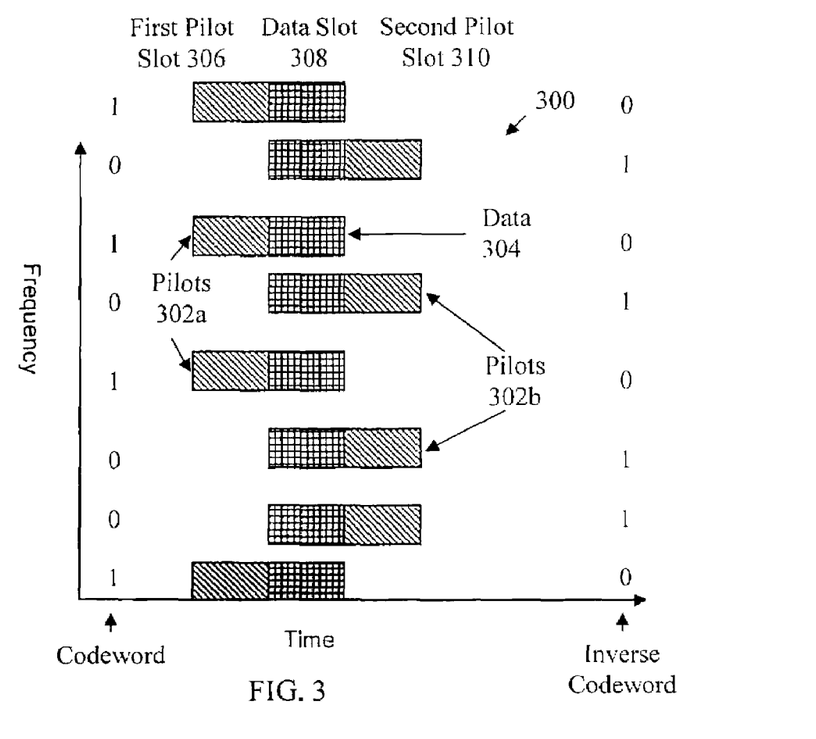
FIG. 3 shows an uplink transmission scheme that uses pilots before and after the data in accordance with one embodiment of the present invention.

Referring now to FIG. 3, an uplink transmission scheme 300 that uses pilots 302 before and after the data 304 in accordance with one embodiment of the present invention is shown. Eight subcarriers are used in this example, which is not intended to limit the invention in any way. Also, data subcarriers may be added on the empty side of each pilot slot. Each subcarrier has a first pilot time slot 306 and a second pilot time slot 310 associated with one or more data time slots 308. As shown, four of the pilots 302a occur in the slot 306 before the data 304 and the other four 302b occur in the slot 310 after the data 304. The remaining pilot positions are idle—no signal is transmitted. Since the channel does-not vary significantly with the duration of these three slots, the pilots form a complete set from which the channel estimates required for demodulation can be obtained. The positions of the pilot symbols are chosen from a code. For example, the codeword (1,0,1,0,1,0,0,1) is used for the pilots in the first pilot time slot 306. Each bit or position of the codeword is associated with on subcarrier—a 1 indicates the presence of a pilot symbol in the first pilot time slot of the associated subcarrier, whereas a 0 indicates the absence of a pilot symbol. In the second pilot time slot 310, the inverse of the above codeword, i.e., (0,1,0,1,0,1,1,0) is used to position the pilot symbols in the different subcarriers.

In other cells, a different codeword may be used to position the pilots. Then, the number of positions in which the pilot symbols between different cells overlap indicates a measure of the susceptibility to co-channel interference. By choosing the codewords from a well-constructed code with good distance properties, a low overlap can be ensured, thereby guaranteeing good performance in the presence of co-channel interference.

As an example, the (8,4) Extended Hamming code can be used to choose appropriate codewords. The codewords of this code are as follows: (0,0,0,0,0,0,0,0), (0,0,0,1,0,1,1,1), (0,0,1,0,1,1,1,0), (0,0,1,1,1,0,0,1), (0,1,0,0,1,0,1,1), (0,1,0,1,1,1,0,0), (0,1,1,0,0,1,0,1), (0,1,1,1,0,0,1,0) and their inverses. Codewords from this code are guaranteed to be different in at least four positions (the minimum distance of the code). Thus, a maximum of four positions on each pilot slot will overlap with the pilot slot from another cell. For example, if cell 1 uses the codeword (0,0,0,1,0,1,1,1) and its inverse (1,1,1,0,1,0,0,0) to position its pilots, and cell 2 uses the codeword (0,1,1,1,0,0,1,0) and its inverse (1,0,0,0,1,1,0,1) to position its pilots, then it can be seen that the pilots overlap in positions 4 & 7 in the first slot, and positions 1 & 5 in the second slot. In each slots, each cell has at least two pilots that are not interfered, and are thus reliable. With higher lengths, more powerful codes such as the (16,8) Nordstrom-Robinson (NR) code could be used. This code has a minimum distance of 6, and will thus have even lesser overlap.

The number of codewords needed will depend on the amount of desired isolation between cells. It helps to have a large number of codewords to choose. With the (8,4) Hamming code, there are only 16 codewords (and only 8 sets, since a codeword and its inverse are used). With the (16,8) NR code, there are 128 sets of codewords, and the codewords need to be reused only after a large distance.

It is also advantageous if the same pilot positions are not overlapped all the time. This can be achieved by having a pseudorandom hopping pattern in each cell so that different codewords are chosen at different times. Using different patterns in different cells, overlapping pilot positions will be different at different times (frames), thereby leading to better average performance. A pseudorandom hopping pattern thus chosen will generate a list of codewords to be used at different times (or in different frames). With 8 codewords, a hopping pattern such as {0,2,4,3,7,5,6,2,1,4,1, . . . } would indicate that the MS should use these codewords from the chosen code, with the indices above identifying particular codewords, to determine the pilot positions at different times, in sequence, as indicated by the hopping pattern. The hopping pattern can be sent to the MS by the base station. A different hopping pattern can be used in other cells. With the use of such hopping patterns, if a transmission from an MS encounters interference from an MS in another cell that happens to be using the same codeword for pilot placement, the different codewords used in the next time instant by the two MS's will ensure that the interference is different, thus achieving better interference immunity. Similar hopping patterns are used for frequency hopping in the GSM system. An exemplary method of generating a hopping pattern is given in the reference 3GPP TS 05.02 V8.10.0 (2001-08), Technical Specification, 3rd Generation Partnership Project; Technical Specification Group GSM/EDGE Radio Access Network; Multiplexing and multiple access on the radio path.

Figure 4:
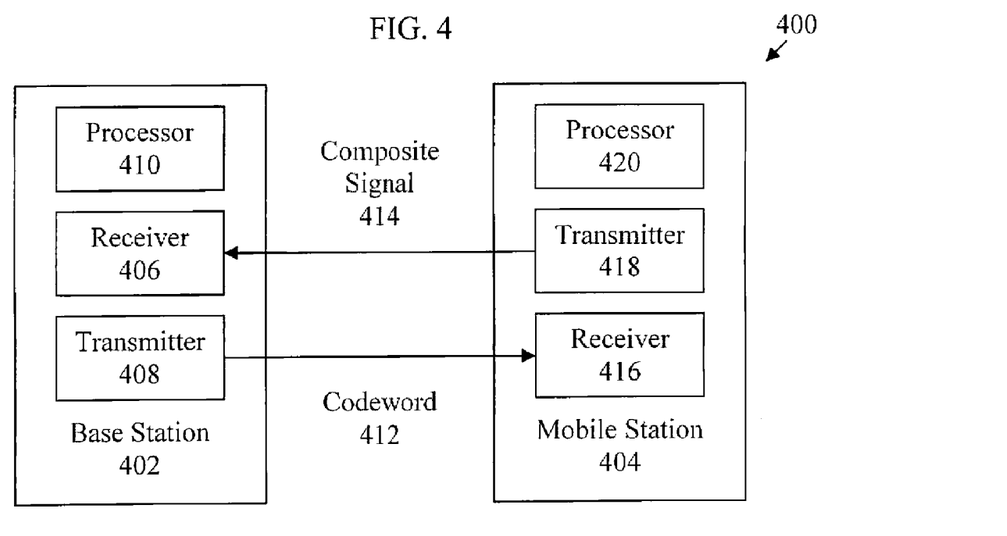
FIG. 4 is a block diagram that shows a system that uses an uplink transmission scheme in accordance with one embodiment of the present invention.

Now referring to FIG. 4, a system 400 that uses an uplink transmission scheme in accordance with one embodiment of the present invention is shown. The system includes one or more base stations 402 and one or more mobile stations 404 communicably coupled to the base stations 402. Each base station 402 includes a base station receiver 406, a base station transmitter 408 and a base station processor 410 communicably coupled to the base station receiver 406 and the base station transmitter 408. The base station processor 410 is configured to send a codeword 412 to one of the mobile stations 404 via the base station transmitter 408, and in response to a composite signal 414 received from the mobile station 404 via the base station receiver 406, obtain the codeword 412 that was sent to the mobile station 404, identify a set of subcarriers dictated by the codeword 412 and extract a pilot signal from the composite signal 414. Likewise, each mobile station 404 includes a mobile station receiver 416, a mobile station transmitter 418 and a mobile station processor 420 communicably coupled to the mobile station receiver 416 and the mobile station transmitter 418. The mobile station processor 420 is configured to receive the codeword 412 from the base station 402 via the mobile station receiver 416, use the codeword 412 for positioning a set of pilot symbols within the set of subcarriers such that each subcarrier comprises a first pilot time slot and a second pilot time slot associated with one or more data time slots, identify the set of subcarriers on which to transmit a composite signal, fill in the first pilot time slots and the second pilot time slots with the pilot symbols in accordance with the codeword 412, format the composite signal 414 as a combination of modulated data signals and pilot signals and transmit the composite signal 414 to the base station 402 via the mobile station transmitter 418.

The base station 402 will typically send the codeword 412 to the mobile station 404 in a control signal message. The base station 402 also stores the received composite signal 414 and performs channel estimation based on the extracted pilot signal. Likewise, the mobile station 404 will also obtain a set of data symbols and fills in the one or more data time slots with the data symbols. The mobile station 404 will typically store the codeword 412 in a memory and then read the codeword 412 from the memory when necessary.

Alternatively, the base station 402 can send a codeword indicator to the mobile station 404 in a control signal message that is used by the mobile station 404 to determine the codeword 412. For example, if the base station 402 and mobile station 404 know that the Extended Hamming code is to be used, a codeword indicator or index of 4 bits can be used to represent the 16 possible codewords rather than sending the full 8 bit codeword, thereby saving transmission resources. Similarly, an indicator to the pseudorandom hopping pattern can be used.

The codeword 412 is used for filling the first pilot time slot and an inverse of the codeword 412 is used for filling the second pilot time slot. The first pilot time slot or the second pilot time slot of each subchannel is filled with at least one pilot symbol. In other words, the first pilot time slot contains no signal when the second pilot time slot is filled with one or more pilot symbols and the second pilot time slot contains no signal when the first pilot time slot is filled with one or more pilot symbols. The codeword 412 can be selected from a set of codewords from a binary error correction code with good distance properties. The codeword 412 can be a different codeword from the same binary error correction code for adjacent cells. For example, an Extended Hamming code or a Nordstrom-Robinson code can be used as the binary error correction code. The distance properties of the error correction code chosen will determine the number of pilot positions in a pilot slot that interfere with a pilot slot used in an adjacent cell.

Figure 5:
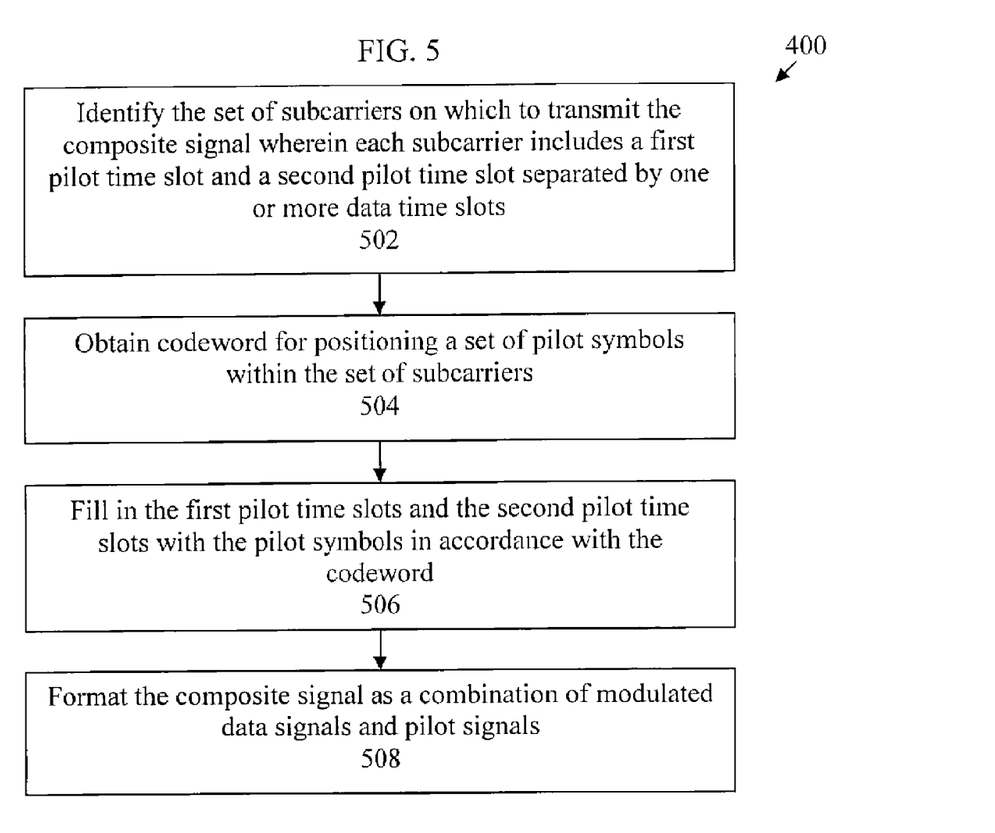
FIG. 5 shows a flowchart of method for creating a composite signal for transmission from a mobile station to a base station in accordance with one embodiment of the present invention.

Referring now to FIG. 5, a flowchart of method 500 for creating a composite signal for transmission from a mobile station to a base station in accordance with one embodiment of the present invention is shown. A set of subcarriers are identified on which to transmit the composite signal in block 502 wherein each subcarrier has a first pilot time slot and a second pilot time slot associated with one or more data time slots. A codeword is obtained in block 504 for positioning a set of pilot symbols within the set of subcarriers and the first pilot time slots and the second pilot time slots are filled with the pilot symbols in accordance with the codeword in block 506. The composite signal is then formatted as a combination of modulated data signals and pilot signals 508. The method can be implemented using a computer program embodied on a computer readable medium wherein the steps are performed by one or more codes segments.

Figure 6:
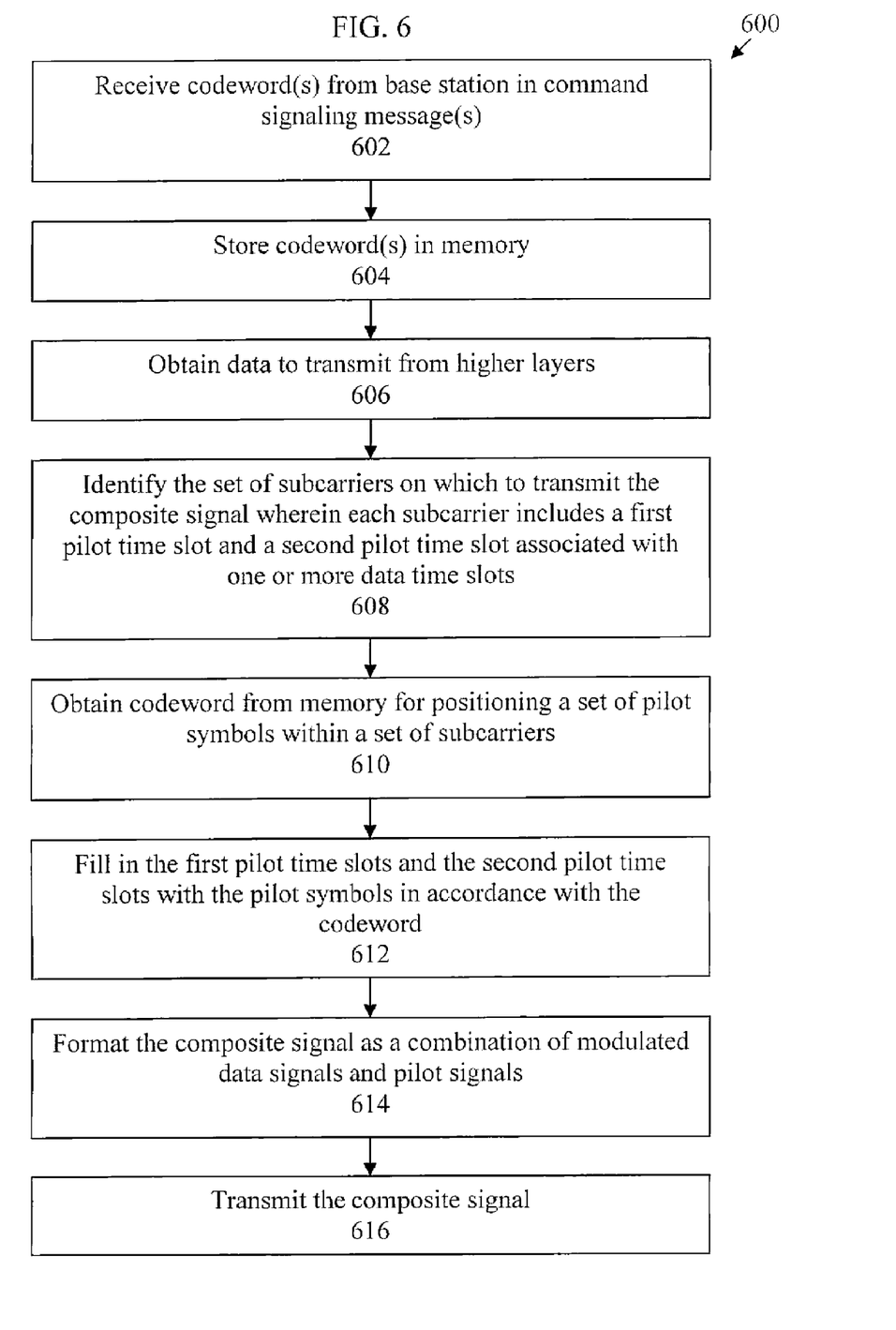
FIG. 6 shows a flowchart of method for creating a composite signal for transmission from a mobile station to a base station in accordance with another embodiment of the present invention.

Now referring to FIG. 6, a flowchart of method 600 for creating a composite signal for transmission from a mobile station to a base station in accordance with another embodiment of the present invention is shown. A control signal message containing the codeword is received from the base station in block 602 and the codeword is stored in a memory in block 604. Thereafter, the data to be transmitted is obtained from higher layers in block 606. The set of subcarriers are identified on which to transmit the composite signal in block 608 wherein each subcarrier has a first pilot time slot and a second pilot time slot associated with one or more data time slots. The codeword is obtained from the memory in block 610 for positioning a set of pilot symbols within the set of subcarriers and the first pilot time slots and the second pilot time slots are filled with the pilot symbols in accordance with the codeword in block 612. The composite signal is then formatted as a combination of modulated data signals and pilot signals 614 and transmitted in block 616. The method can be implemented using a computer program embodied on a computer readable medium wherein the steps are performed by one or more codes segments.

Figure 7:
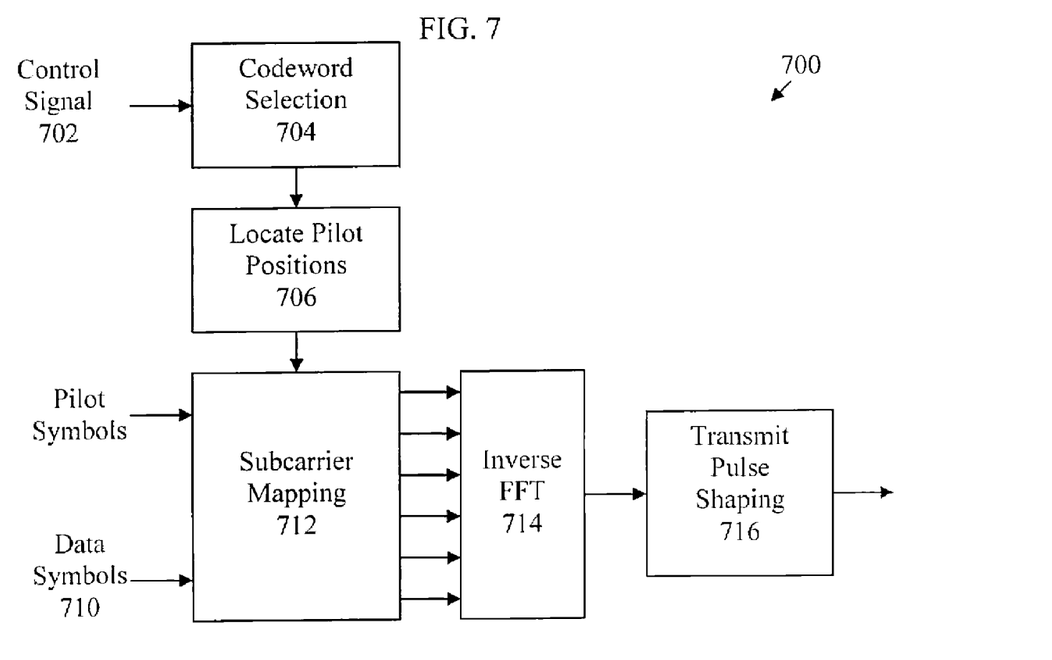
FIG. 7 shows a basic signaling diagram for a mobile station in accordance with one embodiment of the present invention.

Referring now to FIG. 7, a basic signaling diagram 700 for a mobile station in accordance with one embodiment of the present invention is shown. A control signal 702 initiates the selection 704 of a codeword that is used to locate the pilot positions 706. The pilot symbols 708 and data symbols 710 are mapped 712 into the subcarrier and an inverse Fast-Fourier Transform 714 is performed. The resulting transmit signal is then pulse-shaped 716 and transmitted. As will be appreciated by those skilled in the art, other signal processing functions can be made before, during and after the process described herein without detracting from the benefits provided by the present invention.

Figure 8:
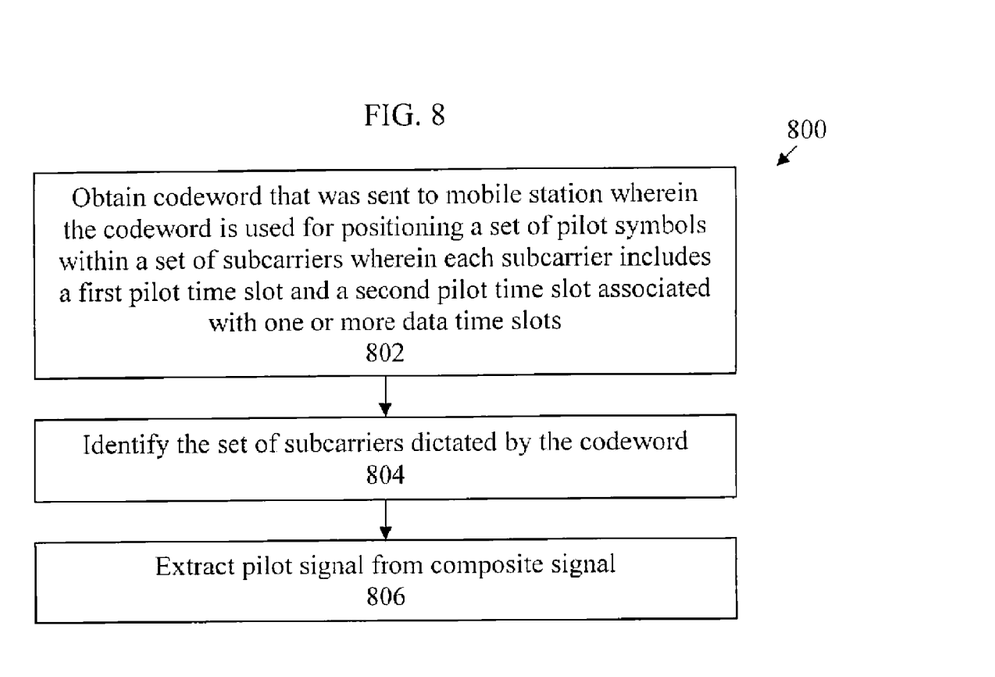
FIG. 8 shows a flowchart of method for extracting a pilot signal from a composite signal received from a mobile station in accordance with one embodiment of the present invention.

Now referring to FIG. 8, a flowchart of method 800 for extracting a pilot signal from a composite signal received from a mobile station in accordance with one embodiment of the present invention is shown. A codeword that was sent to the mobile station is obtained in block 802 wherein the codeword is used to position a set of pilot symbols within a set of subcarriers. Each subcarrier includes a first pilot time slot and a second pilot time slot associated with one or more data time slots, and the first pilot time slots and the second pilot time slots are filled with the pilot symbols in accordance with the codeword. The subcarriers dictated by the codeword are identified in block 804 and the pilot signal is extracted from the composite signal in block 806.

Figure 9:
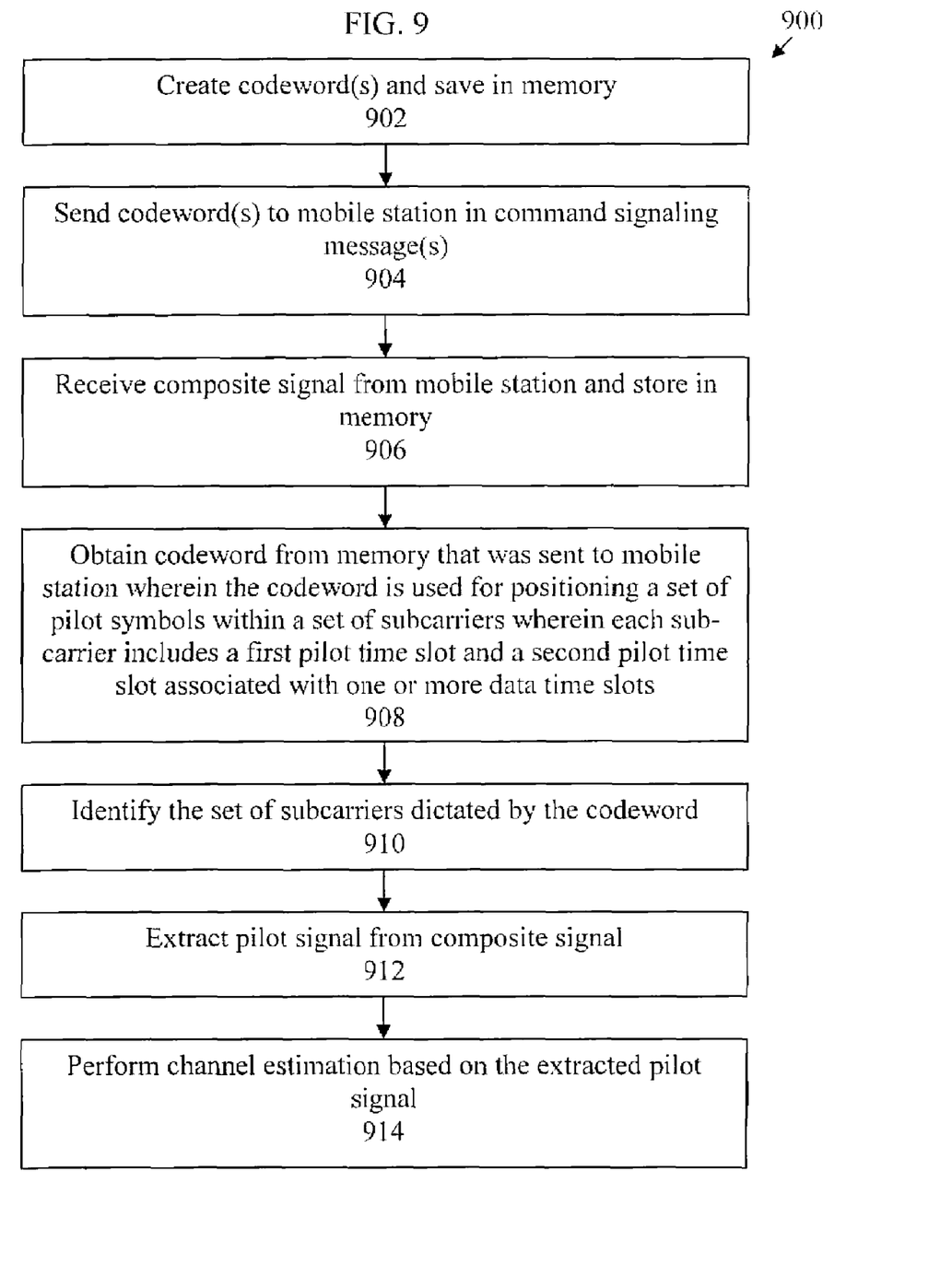
FIG. 9 shows a flowchart of method for extracting a pilot signal from a composite signal received from a mobile station in accordance with another embodiment of the present invention.

Referring now to FIG. 9, a flowchart of method 900 for extracting a pilot signal from a composite signal received from a mobile station in accordance with another embodiment of the present invention is shown. One or more codewords are created in block 902 and the codeword(s) are sent to the mobile station in a control message in block 904. Subsequently, a composite signal is received from the mobile station and stored in block 906. The codeword that was sent to the mobile station is obtained in block 908 wherein the codeword is used to position a set of pilot symbols within a set of subcarriers. Each subcarrier includes a first pilot time slot and a second pilot time slot associated with one or more data time slots, and the first pilot time slots and the second pilot time slots are filled with the pilot symbols in accordance with the codeword. The subcarriers dictated by the codeword are identified in block 910 and the pilot signal is extracted from the composite signal in block 912. The extracted pilot signals are then used to perform channel estimation in block 914

Figure 10:
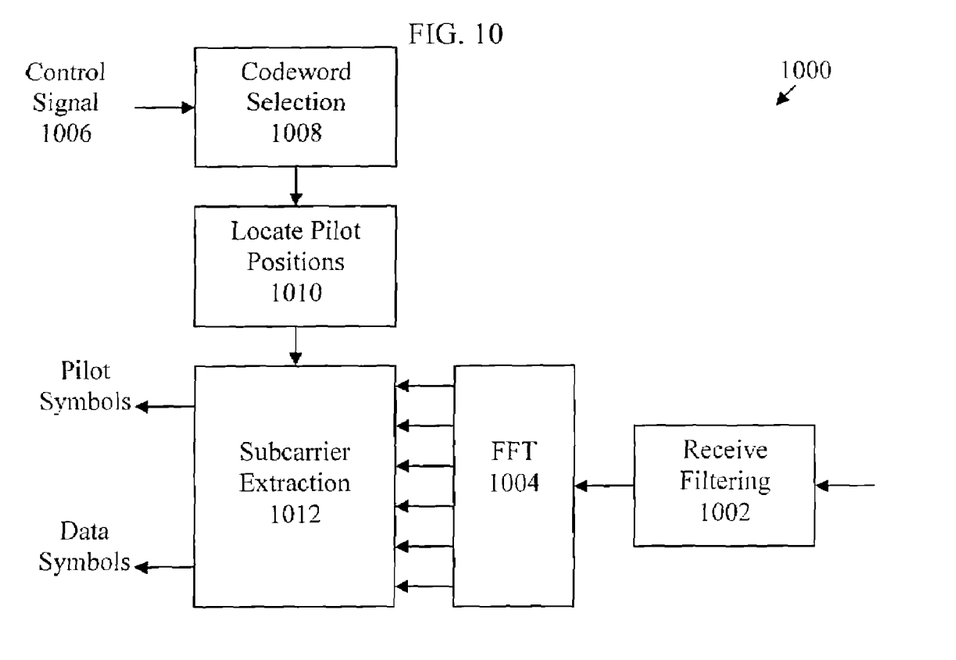
FIG. 10 shows a basic signaling diagram for a base station in accordance with one embodiment of the present invention.

Now referring to FIG. 10, a basic signaling diagram 1000 for a base station in accordance with one embodiment of the present invention is shown. A composite signal received from the mobile station is filtered 1002 and a Fast-Fourier Transform 1004 is performed. A control signal 1006 causes the selection 1008 of a codeword that will be used to locate the pilot positions 1010. The selected codeword is the same codeword that was previously sent to the mobile station in a control signal. The pilot positions 1010 are used to extract 1012 the pilot symbols 1014 and data symbols 1016 from the subcarrier. As will be appreciated by those skilled in the art, other signal processing functions can be made before, during and after the process described herein without detracting from the benefits provided by the present invention.

When two mobile stations need to transmit data to the same base station, the codeword and its inverse can be assigned in order to choose pilot positions for the two mobiles. This allows the pilots assigned to the two mobiles to be non-overlapping. Using the (8,4) Hamming code described earlier, mobile station 1 may use the codeword (0,0,0,1,0,1,1,1) to position pilots in the first pilot slot, and the inverse codeword (1,1,1,0,1,0,0,0) to position pilots in the second pilot slot. Mobile station 2 can use the inverse codeword (1,1,1,0, 1,0,0,0) for the first pilot slot and the inverse of the inverse codeword, .i.e., the codeword itself, (0,0,0,1,0,1,1,1), in the second pilot slot.

Figure 11:
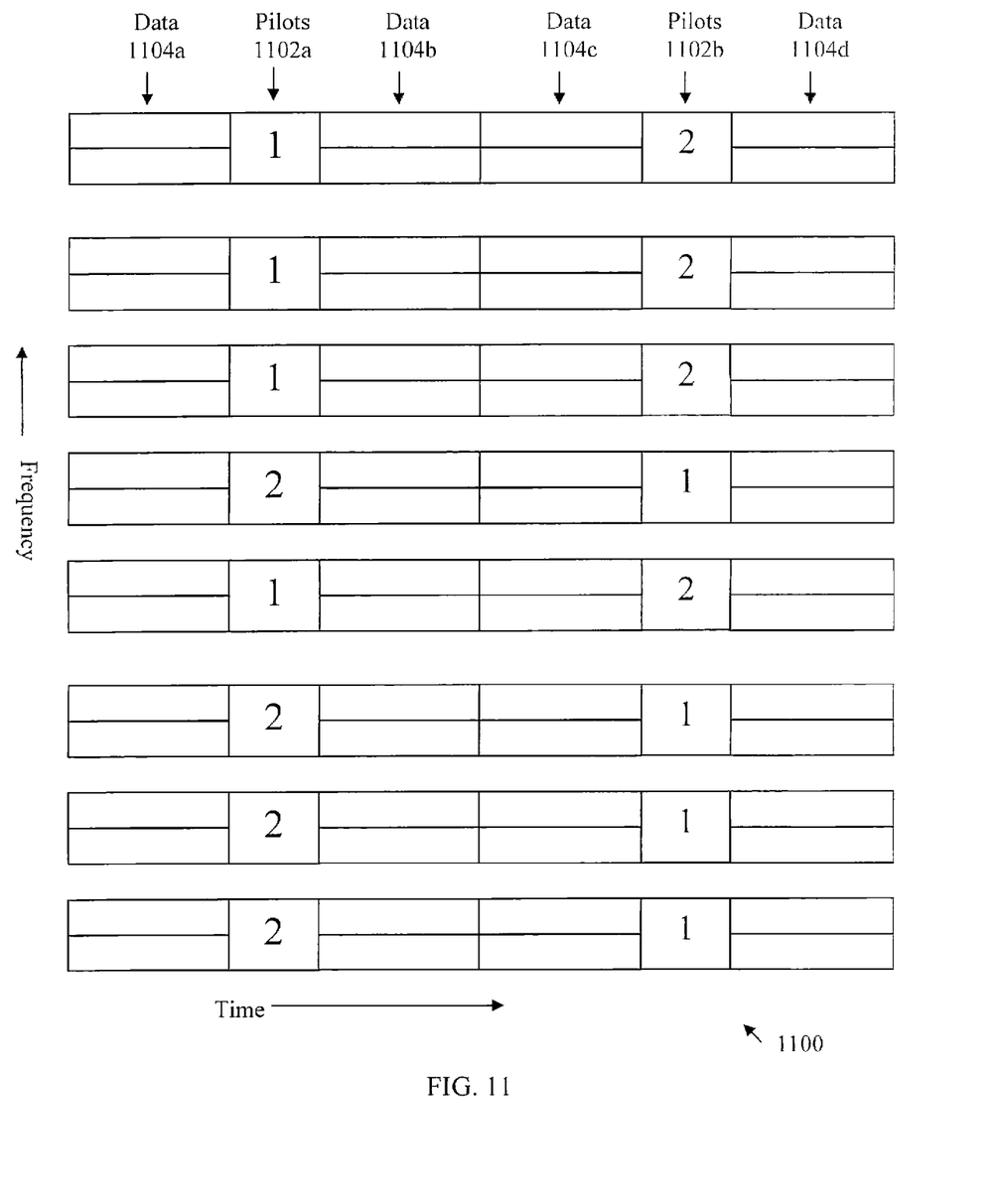
FIG. 11 shows a transmission scheme in accordance with the methods of the current invention for assigning pilots to two mobile stations.

Referring now to FIG. 11, the transmission scheme in accordance with the methods of the current invention for assigning pilots to the two mobile stations is shown. The pilot symbols 1102a and 1102b are divided into two parts over the slot, but are wider in frequency by a factor of two (and thereby narrower in time by a factor of two) compared to the data symbols 1104a, 1104b, 1104c and 1104d. Two mobile stations (users) share the pilot and data symbols. The data slots of the two mobile stations are transmitted over two adjacent sets of interleaved subcarriers (e.g., 1104b and 1104c). For example, user 1 may use the pilot and data symbols identified by the numeral 1, and user 2 may use the pilot and data symbols identified by numeral 2. The (8,4) Extended Hamming code discussed earlier is used to assign pilot positions. The codeword (0,0,0,1,0,1,1,1) is used to assign pilot positions to the second mobile station in the first pilot slot 1102a and the inverse codeword (1,1,1,0,1,0,0,0) is used to assign pilot positions to the first mobile station in the first pilot slot 1102a. The respective inverses are used to assign pilot positions to the mobile stations in the second pilot slot 1102b— inverse codeword (1,1,1,0,1,0,0,0) for the second mobile station and codeword (0,0,0,1,0,1,1,1) for the first mobile station.

Figure 12:
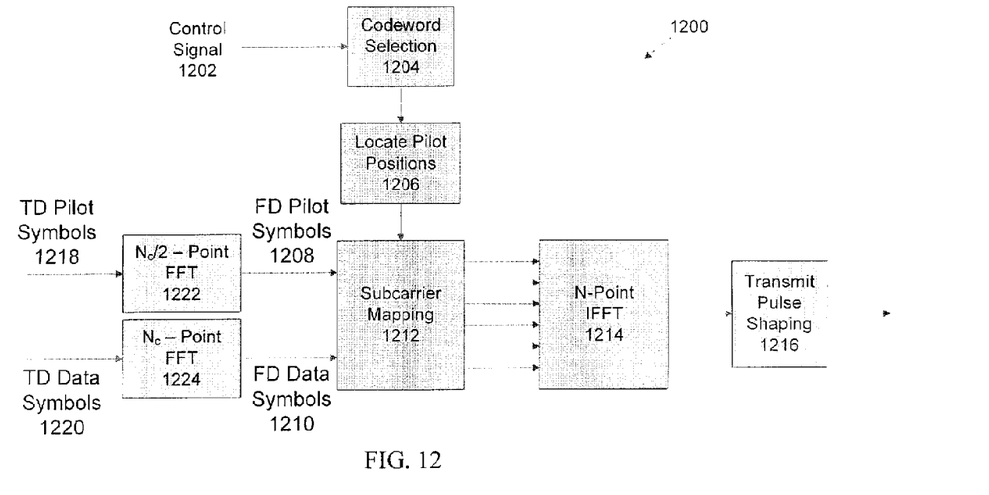
FIG. 12 shows a basic signaling diagram for a mobile station in accordance with one embodiment of the present invention.

Now referring to FIG. 12, a basic signaling diagram 1200 for a mobile station in accordance with one embodiment of the present invention is shown. A control signal 1202 initiates the selection 1204 of a codeword that is used to locate the pilot positions 1206. The time-domain (TD) pilot symbols 1218 are first transformed into frequency-domain (FD) pilot symbols 1208 through an Nc/2-point FFT 1222, while the TD data symbols 1220 are transformed into FD data symbols 1210 through an Nc-point FFT 1224. The size of FFT used to transform the pilot symbols is half of that used to transform the data symbols since the subcarrier spacing of the pilot time slots is double that of the data time slots. The FD pilot symbols 1208 and data symbols 1210 are subsequently mapped 1212 into the proper subcarrier locations in the corresponding pilot and data time slots, respectively. An N-point inverse Fast-Fourier Transform 1214, where $N \geq N_c$ is then performed in each of the pilot and data time slots. The resulting transmit signal is then pulse-shaped 1216 and transmitted. As will be appreciated by those skilled in the art, other signal processing functions can be made before, during and after the process described herein without detracting from the benefits provided by the present invention.

Figure 13:
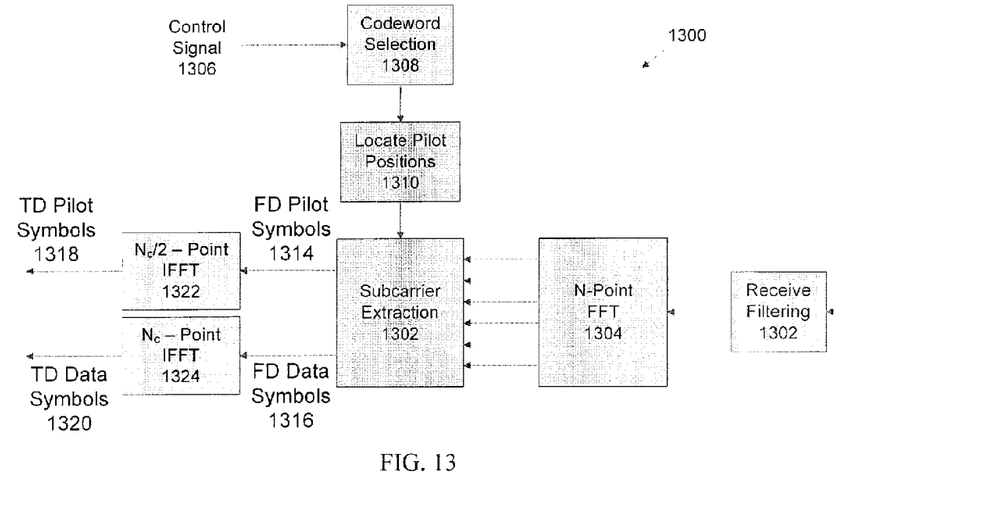
FIG. 13 shows a basic signaling diagram for a base station in accordance with one embodiment of the present invention.

Referring now to FIG. 13, a basic signaling diagram 1300 for a base station in accordance with one embodiment of the present invention is shown. A composite signal received from the mobile station is filtered 1302 and a N-point Fast-Fourier Transform 1304 is performed. A control signal 1306 causes the selection 1308 of a codeword that will be used to locate the pilot positions 1310. The selected codeword is the same codeword that was previously sent to the mobile station in a control signal. The pilot positions 1310 are used to extract 1312 the FD pilot symbols 1314 and data symbols 1316 from the corresponding subcarriers. The FD data symbols 1316 are transformed back into TD data symbols 1320 through an Nc/2-point IFFT 1322 for demodulation. Depending on the channel estimation method adopted, the FD pilot symbols 1314 may be transformed back into TD pilot symbols 1318 through an Nc-point IFFT 1324. As will be appreciated by those skilled in the art, other signal processing functions can be made before, during and after the process described herein without detracting from the benefits provided by the present invention.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification, but only by the claims.

What is claimed:

1. A method for creating a composite signal for transmission from a mobile station to a base station, the method comprising the steps of:
    obtaining a codeword for positioning a set of pilot symbols within a set of subcarriers wherein each subcarrier comprises a first pilot time slot and a second pilot time slot associated with one or more data time slots;
    identifying the set of subcarriers on which to transmit the composite signal;
    filling in the first pilot time slots and the second pilot time slots with the pilot symbols in accordance with the codeword; and
    formatting the composite signal as a combination of modulated data signals and pilot signals.

2. The method as recited in claim 1, wherein the codeword comprises a set of bits such that each bit is associated with one subcarrier and the value of each bit indicates the presence or absence of a pilot symbol for the mobile station within the associated subcarrier.

3. The method as recited in claim 1, wherein no signal is transmitted in the first pilot time slot of a sub-carrier when the second pilot time slot of the sub-carrier is filled with one or more pilot symbols and no signal is transmitted in the second pilot time slot of the sub-carrier when the first pilot time slot of the sub-carrier is filled with one or more pilot symbols.

4. The method as recited in claim 1, wherein the codeword is not the same as a codeword used by other mobile stations in adjacent cells.

5. The method as recited in claim 1, wherein the codeword is used for filling the first pilot time slots and an inverse of the codeword is used for filling the second pilot time slots.

6. The method as recited in claim 1, wherein the codeword is chosen to overlap with an adjacent cell codeword only in a limited number of positions.

7. The method as recited in claim 1, wherein the codeword is based on a pseudorandom hopping pattern.

8. The method as recited in claim 7, wherein the pseudorandom hopping pattern used is different from that used in an adjacent cell.

9. The method as recited in claim 1, wherein the codeword is chosen from a binary error correction code with good distance properties, a Hamming code, an Extended Hamming code, a variant of an Extended Hamming code or a Nordstrom-Robinson code.

10. The method as recited in claim 1, further comprising the steps of:
    obtaining a set of data symbols;
    filling in the one or more data time slots with the data symbols; and
    transmitting the composite signal to the base station.

11. The method as recited in claim 1, wherein the step of obtaining the codeword comprises the steps of:
    receiving a control signal message containing one or more codewords from the base station;

storing the one or more codewords in a memory; and
reading one of the codewords from the memory.

12. The method as recited in claim 1, wherein the step of obtaining the codeword comprises the steps of:
receiving a control signal message containing a codeword indicator from the base station; and
determining the codeword using the codeword indicator.

13. A mobile station comprising:
a receiver;
a transmitter; and
a processor communicably coupled to the receiver and the transmitter wherein the processor is configured to identify the set of subcarriers on which to transmit a composite signal such that each identified subcarrier comprises a first pilot time slot and a second pilot time slot associated with one or more data time slots, obtain a codeword for positioning a set of pilot symbols within the set of subcarriers, fill in the first pilot time slots and the second pilot time slots with the pilot symbols in accordance with the codeword and format the composite signal as a combination of modulated data signals and pilot signals.

14. The mobile station as recited in claim 13, wherein the codeword comprises a set of bits such that each bit is associated with one subcarrier and the value of each bit indicates the presence or absence of a pilot symbol for the mobile station within the associated subcarrier.

15. The mobile station as recited in claim 13, wherein processor is configured to not transmit any signal in the first pilot time slot of a subcarrier when the second pilot time slot of the subcarrier is filled with one or more pilot symbols and not transmit any signal in the second pilot time slot of the subcarrier when the first pilot time slot of the subcarrier is filled with one or more pilot symbols.

16. The mobile station as recited in claim 13, wherein the codeword is not the same as a codeword used by other mobile stations in adjacent cells.

17. The mobile station as recited in claim 13, wherein the processor is configured to use the codeword for filling the first pilot time slots and an inverse of the codeword is used for filling the second pilot time slots.

18. The mobile station as recited in claim 13, wherein the codeword is chosen to overlap with an adjacent cell codeword only in a limited number of positions.

19. The mobile station as recited in claim 13, wherein the codeword is based on a pseudorandom hopping pattern.

20. The mobile station as recited in claim 19, wherein the pseudorandom hopping pattern used is different from that used in an adjacent cell.

21. The mobile station as recited in claim 13, wherein the codeword is chosen from a binary error correction code with good Hamming distance properties, an Extended Hamming code, a variant of an Extended Hamming code or a Nordstrom-Robinson code.

22. The mobile station as recited in claim 13, wherein the processor is further configured to obtain a set of data symbols, fill in the one or more data time slots with the data symbols and transmits the composite signal to the base station.

23. The mobile station as recited in claim 13, wherein the processor is configured to obtain the codeword by receiving a control signal message containing one or more codewords from the base station, storing the one or more codewords in a memory and reading one of the codewords from the memory.

24. The mobile station as recited in claim 13, wherein the processor is configured to obtain the codeword by receiving a control signal message containing a codeword indicator from the base station and determining the codeword using the codeword indicator.

25. A method for extracting a pilot signal from a composite signal received from a mobile station, the method comprising the steps of:
obtaining a codeword that was sent to the mobile station wherein the codeword is used to position a set of pilot symbols within a set of subcarriers, such that each subcarrier comprises a first pilot time slot and a second pilot time slot associated with one or more data time slots, and the first pilot time slots and the second pilot time slots are filled with the pilot symbols in accordance with the codeword;
identifying the subcarriers dictated by the codeword; and
extracting the pilot signal from the composite signal.

26. The method as recited in claim 25, wherein the first pilot time slot of a subcarrier contains no signal when the second pilot time slot of the subcarrier is filled with one or more pilot symbols and the second pilot time slot of the subcarrier contains no signal when the first pilot time slot of the subcarrier is filled with one or more pilot symbols.

27. The method as recited in claim 25, wherein the codeword is not the same as a codeword used by other mobile stations in adjacent cells.

28. The method as recited in claim 25, wherein the codeword is used for filling the first pilot time slots and an inverse of the codeword is used for filling the second pilot time slots.

29. The method as recited in claim 25, wherein the codeword is chosen to overlap with an adjacent cell codeword only in a limited number of positions.

30. The method as recited in claim 25, wherein the codeword is based on a pseudorandom hopping pattern.

31. The method as recited in claim 30, wherein the pseudorandom hopping pattern used is different from that used in an adjacent cell.

32. The method as recited in claim 25, wherein the codeword is chosen from a binary error correction code with good Hamming distance properties, an Extended Hamming code, a variant of an Extended Hamming code or a Nordstrom-Robinson code.

33. The method as recited in claim 25, further comprising the steps of:
sending one or more codewords to the mobile station in a control signal message;
receiving the composite signal;
storing the received composite signal; and
performing channel estimation based on the extracted pilot signal.

34. The method as recited in claim 25, further comprising the step of sending a codeword indicator to the mobile station in a control signal message that is used by the mobile station to determine the codeword.

35. A base station comprising:
a receiver;
a transmitter;
a processor communicably coupled to the receiver and the transmitter wherein the processor is configured to obtain a codeword that was sent to the mobile station, identify a set of subcarriers dictated by the codeword and extract the pilot signal from the composite signal; and
wherein the codeword is used to position a set of pilot symbols within the set of subcarriers, such that each subcarrier comprises a first pilot time slot and a second pilot time slot associated with one or more data time slots, and the first pilot time slots and the second pilot time slots are filled with the pilot symbols in accordance with the codeword.

36. The base station as recited in claim 35, wherein the codeword comprises a set of bits such that each bit is associated with one subcarrier and the value of each bit indicates the presence or absence of a pilot symbol for the mobile station within the associated subcarrier.

37. The base station as recited in claim 35, wherein the first pilot time slot of a subcarrier contains no signal when the second pilot time slot of the subcarrier is filled with one or more pilot symbols and the second pilot time slot of the subcarrier contains no signal when the first pilot time slot of the subcarrier is filled with one or more pilot symbols.

38. The base station as recited in claim 35, wherein:
the codeword is not the same as a codeword used by other mobile stations in adjacent cells;
the codeword is used for filling the first pilot time slot and an inverse of the codeword is used for filling the second pilot time slot; or
the codeword is chosen to overlap with an adjacent cell codeword only in a limited number of positions.

39. The base station as recited in claim 35, wherein the codeword is based on a pseudorandom hopping pattern.

40. The base station as recited in claim 39, wherein the pseudorandom hopping pattern used is different from that used in an adjacent cell.

41. The base station as recited in claim 35, wherein the codeword is chosen from a binary error correction code with good Hamming distance properties, an Extended Hamming code, a variant of an Extended Hamming code or a Nordstrom-Robinson code.

42. The base station as recited in claim 35, wherein the processor is further configured to send one or more codewords to the mobile station in a control signal message, receive the composite signal, store the received composite signal or perform channel estimation based on the extracted pilot signal.

43. The base station as recited in claim 35, wherein the processor is further configured to send a codeword indicator to the mobile station in a control signal message that is used by the mobile station to determine the codeword.

44. The base station as recited in claim 35, wherein:
the base station assigns the codeword to a first mobile station and an inverse of the codeword to a second mobile station; and
the first and second mobile stations use the data symbols in a non-overlapping and interleaved fashion.

45. A system comprising:
one or more base stations;
one or more mobile stations communicably coupled to the base stations;
each base station comprising a base station receiver, a base station transmitter and a base station processor communicably coupled to the base station receiver and the base station transmitter wherein the base station processor is configured to send a codeword to one of the mobile stations via the base station transmitter, and in response to a composite signal received from the mobile station via the base station receiver, obtain the codeword that was sent to the mobile station, identify a set of subcarriers dictated by the codeword and extract a pilot signal from the composite signal; and
each mobile station comprising a mobile station receiver, a mobile station transmitter and a mobile station processor communicably coupled to the mobile station receiver and the mobile station transmitter wherein the mobile station processor is configured to identify the set of subcarriers on which to transmit a composite signal such that each identified subcarrier comprises a first pilot time slot and a second pilot time slot associated with one or more data time slots, receive the codeword from the base station via the mobile station receiver, use the codeword for positioning a set of pilot symbols within the set of subcarriers, fill in the first pilot time slots and the second pilot time slots with the pilot symbols in accordance with the codeword, format the composite signal as a combination of modulated data signals and pilot signals and transmit the composite signal to the base station via the mobile station transmitter.

46. The base station as recited in claim 45, wherein:
the base station processor is configured to send a codeword indicator to the mobile station; and
the mobile station processor is configured to receive the codeword indicator from the base station and determine the codeword from the codeword indicator.

47. The system as recited in claim 45, wherein:
the base station assigns the codeword to a first mobile station and an inverse of the codeword to a second mobile station; and
the first and second mobile stations use the data symbols in a non-overlapping and interleaved fashion.

* * * * *

UNITED STATES PATENT AND TRADEMARK OFFICE
CERTIFICATE OF CORRECTION

PATENT NO. : 7,720,164 B2  
APPLICATION NO. : 11/678946  
DATED : May 18, 2010  
INVENTOR(S) : Ramesh et al.

Page 1 of 1

It is certified that error appears in the above-identified patent and that said Letters Patent is hereby corrected as shown below:

On the Title Page, in Field (56), under "OTHER PUBLICATIONS", in Column 2, Line 4, delete "Schnell; ln.terleaved" and insert -- Schnell; Interleaved --, therefor.

On the Title Page, in the Figure, below "Pilot Symbols", insert tag -- 708 --.

In Fig. 5, Sheet 3 of 9, delete "400" and insert tag -- 500 --, therefor.

In Fig. 7, Sheet 5 of 9, below "Pilot Symbols", insert tag -- 708 --.

In Fig. 10, Sheet 7 of 9, below "Pilot Symbols", insert tag -- 1014 --.

In Fig. 10, Sheet 7 of 9, below "Data Symbols", insert tag -- 1016 --.

Signed and Sealed this  
First Day of May, 2012

David J. Kappos  
*Director of the United States Patent and Trademark Office*